United States Patent
Odaohhara

(10) Patent No.: US 7,494,729 B2
(45) Date of Patent: Feb. 24, 2009

(54) OPTIMIZED BATTERY PERFORMANCE

(75) Inventor: Shigefumi Odaohhara, Yamato (JP)

(73) Assignee: International Business Machines Corporation, Armonk, NY (US)

( * ) Notice: Subject to any disclaimer, the term of this patent is extended or adjusted under 35 U.S.C. 154(b) by 861 days.

(21) Appl. No.: 10/997,532

(22) Filed: Nov. 24, 2004

(65) Prior Publication Data

US 2005/0116686 A1    Jun. 2, 2005

(30) Foreign Application Priority Data

Nov. 28, 2003   (JP)   ............................. 2003-400306

(51) Int. Cl.
H01M 10/44   (2006.01)
H01M 16/00   (2006.01)

(52) U.S. Cl. ................................ 429/9; 429/50; 429/51; 320/135

(58) Field of Classification Search ...................... 429/9, 429/50, 61; 320/135
See application file for complete search history.

(56) References Cited

U.S. PATENT DOCUMENTS

| 6,377,027 | B2 * | 4/2002 | Takemoto | ................... 320/135 |
| 6,424,123 | B1 * | 7/2002 | Odaohhara et al. | .......... 320/134 |
| 6,838,858 | B2 * | 1/2005 | Berneis et al. | ............... 320/135 |
| 2003/0054229 | A1 * | 3/2003 | Odaohhara et al. | ............ 429/61 |

* cited by examiner

Primary Examiner—Stephen J. Kalafut
(74) Attorney, Agent, or Firm—Jason O. Piche

(57) ABSTRACT

In an electrical instrument to which a plurality of battery blocks and/or a plurality of batteries are detachably connectable, to prevent a phenomenon that only specific battery and battery block are deteriorated. A hybrid battery connectable to a body of an electrical instrument consuming electrical power includes: a cell block which includes one or more battery cells, and supplies electrical power to the body of the electrical instrument by discharging after being charged; and a cell block which includes one or more battery cells, supplies electrical power to the body of the electrical instrument by discharging after being charged, and becomes active selectively with the former cell block. In the hybrid battery, a CPU selects a cell block becoming active based on the number of charge/discharge cycles of the former cell block and the number of charge/discharge cycles of the latter cell block.

18 Claims, 7 Drawing Sheets

CELL BLOCK A . 150 CYCLES
(82% CAPACITY)

CELL BLOCK B . 150 CYCLE
(82% CAPACITY)

PACK CAPACITY : 82%

(a)

CELL BLOCK A . 300 CYCLES
(40% CAPACITY)

CELL BLOCK B . 0 CYCLE
(100% CAPACITY)

PACK CAPACITY : 70%

OPTIMIZED BATTERY PERFORMANCE

BACKGROUND OF THE INVENTION

The present invention relates to an electrical instrument such as a computer apparatus, and the like, and more specifically, to an electrical instrument using a plurality of battery blocks and batteries as a battery, and the like.

In a variety of electrical instruments including information terminal instruments represented by a notebook personal computer (notebook PC), personal instruments such as a PDA (Personal Digital Assistant), various portable audio instruments, video cameras, and the like, there is a case of receiving a supply of electrical power from a battery (storage battery, secondary battery) usable over and over again while repeating charge/discharge, besides a case of receiving the supply of electrical power directly from a commercial power supply through, for example, an AC adapter. As this battery, a nickel-metal hydride battery (NiMH battery) or a nickel-cadmium battery (NiCd battery), which has a relatively large capacity and is inexpensive, is used. Moreover, there is a case where a lithium-ion battery which has a higher energy density per unit weight as compared with the nickel-cadmium battery, a lithium-polymer battery using a solid polymer without using a liquid electrolyte, or the like, is used.

Among the electrical instruments as described above, for example, the notebook PC is configured to be able to be equipped with a battery pack in which such a kind of battery is housed, and a user operates a system body of the notebook PC by battery drive at a place where an AC power supply is not present. However, an operating time of the battery from a full charge state thereof in the battery pack is not always satisfactory to the user. Therefore, a notebook PC having a so-called dual battery system in which two batteries are mounted has been heretofore proposed. Specifically, there has existed a model capable of attaching a battery pack of a second battery, instead of, for example, a drive of a CD-RW, a DVD and the like, to an expansion bay, an expansion base (Ultrabase) or the like, in addition to a battery pack of a main battery (standard battery), which is attached to a cabinet of the system body.

As conventional technologies described in publications, for example, in an apparatus provided with a first battery and a second battery, there has already existed a technology of constantly grasping states of the batteries, activating the batteries, and extending lifetimes thereof in a manner that a load switching circuit is controlled to alternately connect the first battery and the second battery to a load circuit (for example, refer to Patent Document 1). Meanwhile, the inventors of the present invention have already proposed an invention in which, in the apparatus provided with the first battery and the second battery, a loss of electrical power due to a diode is prevented to extend an operating time by battery drive (for example, refer to Patent Document 2).

[Patent Document 1] Japanese Patent Laid-Open No. Hei 8 (1996)-37740 (pp. 3-4, FIG. 1)

[Patent Document 2] Japanese Patent No. 2708374 (pp. 5-7, FIG. 2)

Meanwhile, the inventors of the present invention continue to research a technology of constituting one battery pack by mixing different types of batteries. When different types of battery cells are connected in series or in parallel, in general, the battery cells are rapidly deteriorated. Accordingly, the different types of battery cells are not usually used in a mixed manner. When a plurality of battery cells are used as a block, it is common to form the block while equalizing characteristics of the plurality of battery cells as much as possible. In this case, for example, even if the battery cells are of the same type, and a lot or the like in manufacture thereof is the same, the same ones in performance are further selected for the battery cells. However, for example, even if there is an unused space in the battery pack, the space cannot be completely filled depending on a shape of the cells, and such an empty space has not been able to be utilized effectively. For example, cylindrical and rectangular lithium-ion batteries cannot be mixed even if both of them are equally the lithium-ion batteries. If these batteries can be mixed, it becomes possible to utilize the space effectively, thus making it possible to design a shape of the battery pack flexibly.

Therefore, the inventors of the present invention are pursuing a research on commercialization of a hybrid battery in which cell blocks (battery blocks) are composed by connecting single cell batteries in series or in parallel for each of the battery cells of the same type. In the hybrid battery as described above, in which the plurality of battery blocks are arranged, a configuration in which different cells are not electrically connected to each other is adopted, and thus an occurrence of the cell deterioration is suppressed. However, when the number of charge/discharge cycles is increased in one of the battery blocks significantly more than in the other battery block, a degree of the battery deterioration is increased as the number of charge/discharge cycles in the one battery block is increased. Consequently, a battery lifetime of the hybrid battery is lowered. This hybrid battery forms one cabinet as a battery pack, and the deterioration of the one battery block leads to a deterioration of the entire hybrid battery. As a result of this, a total battery capacity of the hybrid battery is reduced.

Moreover, as described in a column of the Background Art, also in the dual battery system in which the plurality of batteries such as the main battery and the second battery are mounted on the instrument, there is a case where only one of the batteries is preferentially used. In such a case, only the one battery shortens a lifetime thereof extremely, as well as the entire battery capacity is also lowered. For example, in the Patent Document 1, when it is assumed that the first battery is the main battery and the second battery is the second battery (sub-battery connected to the bay drive), in the case of a user usually using the notebook PC without connecting the second battery to the bay drive, only the number of charge/discharge cycles of the main battery is increased. In this case, the problem described above cannot be solved only by performing the alternate switching control as in the Patent Document 1. Meanwhile, for a user who has purchased a new notebook PC, a state where only the number of charge/discharge cycles of the second battery is increased is brought. In this case, only a lifetime of the second battery is extremely shortened only by performing the alternate switching control as in the Patent Document 1.

SUMMARY OF THE INVENTION

The present invention has been created in order to solve such technical problems as described above. It is a purpose of the present invention to prevent a phenomenon that only specific battery and battery block are deteriorated in an electrical instrument to which a plurality of battery blocks or a plurality of batteries such as a so-called hybrid battery and a so-called dual battery system are connectable.

Moreover, it is another purpose of the present invention to maintain a total battery capacity at a high level in the electrical instrument to which a plurality of batteries and a plurality of battery blocks are connectable by equalizing the numbers of charge/discharge cycles.

In order to achieve the foregoing purposes, in the present invention, in the case where a so-called hybrid battery having a plurality of cell blocks (battery blocks) arranged therein and/or a plurality of batteries such as so-called dual batteries in which two batteries are mounted on an instrument are connected to the instrument, a discharge control is performed such that the numbers of charge/discharge cycles of the respective cell blocks become even with each other and such that the numbers of charge/discharge cycles of the respective batteries become even with each other. Thus, a phenomenon that only one of the cell blocks and only one of the batteries are significantly deteriorated is prevented. Specifically, an aspect to which the present invention is applied is a battery pack connectable to a body of an electrical instrument consuming electrical power, comprising: a first cell block which comprises one or more battery cells, and supplies electrical power to the body of the electrical instrument by discharging after being charged; and a second cell block which comprises one or more battery cells, supplies electrical power to the body of the electrical instrument by discharging after being charged, and becomes active selectively with the first cell block, wherein a cell block becoming active is selected between the first cell block and the second cell block based on the number of charge/discharge cycles of the first cell block and the number of charge/discharge cycles of the second cell block.

Here, the number of charge/discharge cycles of the first cell block and the number of charge/discharge cycles of the second cell block may be compared with each other, and one in which the number of charge/discharge cycles is smaller may be is preferentially selected to be active.

Moreover, the battery pack may comprise a controller which recognizes the number of charge/discharge cycles of the first cell block and the number of charge/discharge cycles of the second cell block, and selects the cell block becoming active such that a difference between the recognized number of charge/discharge cycles of the first cell block and the recognized number of charge/discharge cycles of the second cell block falls within a specific range.

Note that there is also a case where this battery pack includes not only two cell blocks but also a plurality (three or more) of cell blocks. In such a case, a specific cell block is regarded as the first cell block, and the other arbitrary cell block is regarded as the second cell block, and thus the present invention is applied also to a battery pack including third and fourth cell blocks in a similar way. The same can be said below also for a relationship between a first battery and a second battery, which will be described later.

Meanwhile, an electrical instrument to which the present invention is applied comprises: a body consuming electrical power; and a hybrid battery which is connectable to the body, has a plurality of cell blocks electrically unconnected to one another arranged therein, and supplies electrical power to the body by discharging from a specific cell block among the plurality of cell blocks, wherein, in the hybrid battery, a cell block becoming active is selected such that a difference in the number of charge/discharge cycles among the respective cell blocks configuring the plurality of cell blocks falls within a specific range.

Here, the hybrid battery may comprise a controller which recognizes the numbers of charge/discharge cycles of the respective cell blocks configuring the plurality of cell blocks, and selects the cell block becoming active in a discharge such that differences in the recognized numbers of charge/discharge cycles among the respective cell blocks fall to a threshold value or less. This controller achieves a communication with a controller on a body side, and transmits data of a grasped total capacity of the plurality of cell blocks and the like to the controller on the body side.

When grasped from another viewpoint, an electrical instrument to which the present invention is applied comprises: a body consuming electrical power; a first battery which is connectable to the body, and supplies electrical power to the body; and a second battery which is connectable to the body, and becomes active selectively with the first battery to supply electrical power to the body, wherein the body performs a switching control between the first battery and the second battery such that the numbers of charge/discharge cycles of the first battery and the second battery become even with each other in the case where the first battery and the second battery are connected to the body.

Here, the body may comprise: a controller which recognizes the numbers of charge/discharge cycles of the first battery and the second battery, and selects a battery becoming active in a discharge such that a difference between the recognized number of charge/discharge cycles of the first battery and the recognized number of charge/discharge cycles of the second battery falls to a threshold value or less; and a switching circuit which switches either the first battery or the second battery based on an instruction from the controller. Moreover, the term "even" implies not a complete coincidence but one having a certain range.

Moreover, the present invention can be grasped as a computer apparatus such as a notebook PC. Specifically, an aspect to which the present invention is applied is as a computer apparatus configured in a manner that a main battery which supplies electrical power to a system body, and a second battery which supplies electrical power to the system body and becomes active selectively with the main battery to then discharge, are connectable to the system body, the computer apparatus comprising: a controller which selects a battery becoming active in a discharge such that a difference in the number of charge/discharge cycles between the main battery and the second battery falls within a specific range; and a switching circuit which switches either the main battery or the second battery based on an instruction from the controller.

The controller may recognize the numbers of charge/discharge cycles of the main battery and the second battery, determines whether or not the difference between the recognized number of charge/discharge cycles of the main battery and the recognized number of charge/discharge cycles of the second battery falls to a predetermined value or less, and selects the battery becoming active in the discharge such that the difference falls to the predetermined value or less. This predetermined value is a value within which the numbers of charge/discharge cycles are equivalent (even, uniform) to each other, and for example, three cycles, 10 cycles and the like can be selected.

From another viewpoint, the present invention can be embodied in a computer apparatus configured in a manner that a main battery which supplies electrical power to a system body, and a second battery which supplies electrical power to the system body and becomes active selectively with the main battery to then discharge, are connectable to the system body, the computer apparatus comprising: recognizing means for recognizing the number of charge/discharge cycles of the main battery and the number of charge/discharge cycles of the second battery; and means for preferentially making a battery in which the number of charge/discharge cycles is smaller active between the main battery and the second battery based on recognitions by the recognizing means.

Here, on condition that there is a difference exceeding a predetermined value as a result of a comparison between the number of charge/discharge cycles of the main battery and the number of charge/discharge cycles of the second battery, which are recognized by the recognizing means, the means for preferentially making a battery active may select the battery in which the number of charge/discharge cycles is smaller active.

Furthermore, when the present invention is grasped from an invention of a method, an aspect to which the present invention is applied is as a method of controlling a battery which is connectable to a body consuming electrical power, has a plurality of cell blocks electrically unconnected to one another arranged therein, and supplies electrical power to the body by discharging from any cell block among the plurality of cell blocks, the method comprising the steps of: recognizing the number of charge/discharge cycles for each of the plurality of cell blocks; and selecting a cell block to discharge based on the recognized number of charge/discharge cycles for each of the plurality of cell blocks. Here, the step of selecting a cell block may select the cell block to discharge such that the number of charge/discharge cycles for each of the plurality of cell blocks becomes even with others.

Then, an aspect to which the present invention is applied is as a method of supplying electrical power to an electrical instrument to which both of a first battery and a second battery are connected, the first battery supplying electrical power to a body consuming electrical power and the second battery becoming active selectively with the first battery and supplying electrical power to the body, the method comprising the steps of: recognizing the number of charge/discharge cycles of the first battery and the number of charge/discharge cycles of the second battery; and selecting a battery serving as a supply source of the electrical power between the first battery and the second battery based on the recognized number of charge/discharge cycles of the first battery and number of charge/discharge cycles of the second battery. Here, the step of selecting a battery may select the battery serving as the supply source of the electrical power such that the number of charge/discharge cycles of the first battery and the number of charge/discharge cycles of the second battery become even with each other.

Moreover, a program to which the present invention is applied allows a computer, which is configured in a manner that both of a first battery which supplies electrical power to a body consuming electrical power and a second battery which becomes active selectively with the first battery and supplies electrical power to the body are connectable thereto, to realize: a function to recognize the number of charge/discharge cycles of the connected first battery and the number of charge/discharge cycles of the connected second battery; and a function to select a battery serving as a supply source of the electrical power between the first battery and the second battery based on the recognized number of charge/discharge cycles of the first battery and number of charge/discharge cycles of the second battery.

Here, the function to select a battery may compare the number of charge/discharge cycles of the first battery and the number of charge/discharge cycles of the second battery with each other, and preferentially selects a battery in which the number of charge/discharge cycles is smaller to become active. Moreover, the function to select a battery may select the battery serving as the supply source of the electrical power such that the number of charge/discharge cycles of the first battery and the number of charge/discharge cycles of the second battery become even with each other.

Note that, in the respective inventions described above, "the first battery" and "the second battery" are not limited to the batteries of the system (for example, the dual battery system) in which the plurality of batteries are connected to the electrical instrument, and there is also a case where "the first battery" and "the second battery" can be grasped as battery blocks configuring the battery pack (for example, the hybrid battery) in which the plurality of battery blocks are housed.

BRIEF DESCRIPTION OF THE DRAWINGS

Some of the purposes of the invention having been stated, others will appear as the description proceeds, when taken in connection with the accompanying drawings, in which:

FIGS. 4(a) and 4(b) are views for considering a specific degree of deterioration in a hybrid battery using cell blocks having deterioration characteristics;

DETAILED DESCRIPTION OF THE ILLUSTRATIVE EMBODIMENTS

While the present invention will be described more fully hereinafter with reference to the accompanying drawings, in which a preferred embodiment of the present invention is shown, it is to be understood at the outset of the description which follows that persons of skill in the appropriate arts may modify the invention here described while still achieving the favorable results of this invention. Accordingly, the description which follows is to be understood as being a broad, teaching disclosure directed to persons of skill in the appropriate arts, and not as limiting upon the present invention.

According to the present invention, in the electrical instrument to which the plurality of battery blocks such as the so-called hybrid battery and/or batteries such as the dual battery system are connectable, it becomes possible to prevent the phenomenon that only the specific battery block and battery are deteriorated.

Figure 1:
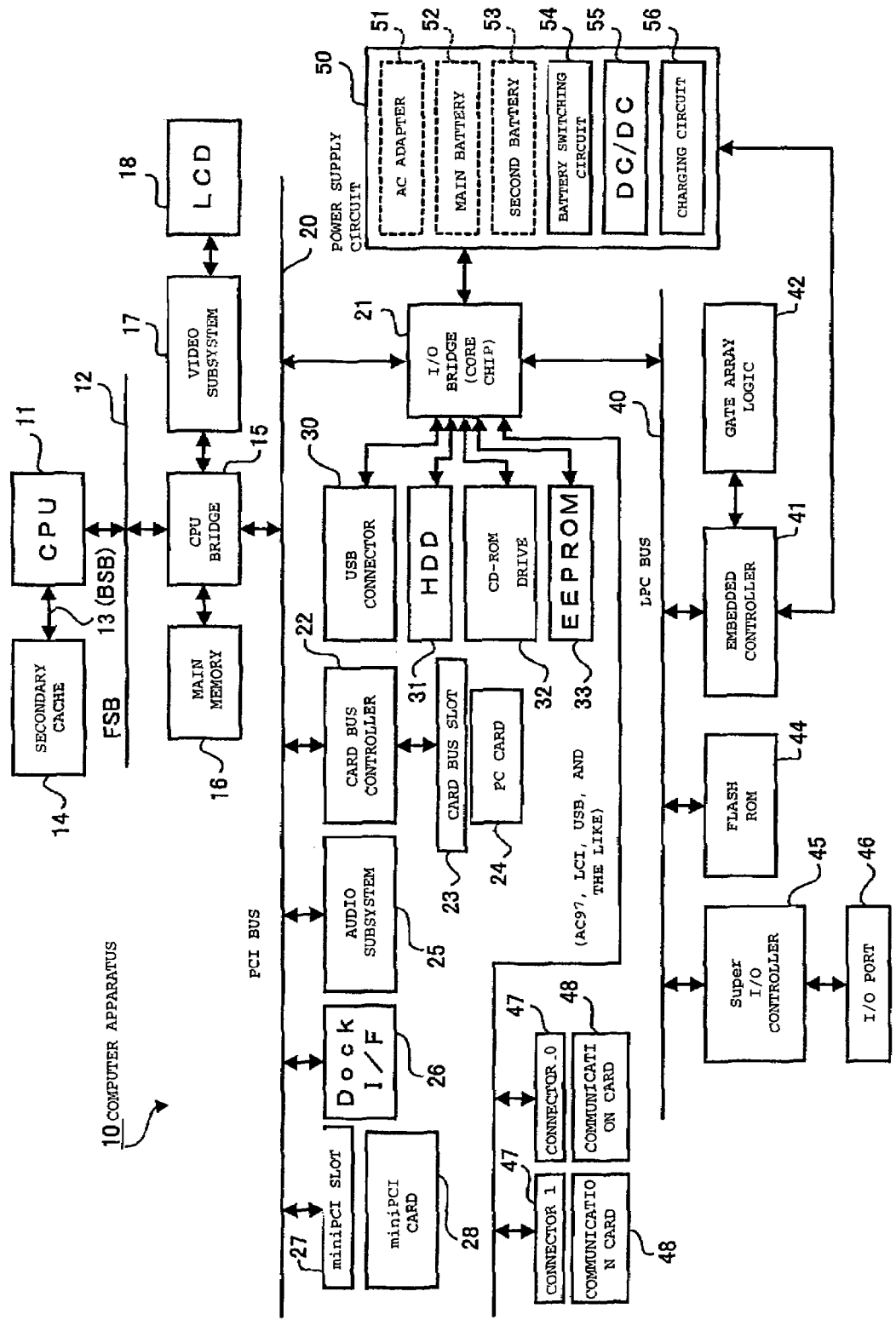
FIG. 1 is a view showing a hardware configuration of a computer apparatus such as a notebook personal computer (notebook PC) as an example of an electrical instrument.

Referring now more particularly to the accompanying drawings, in which like numerals indicate like elements or steps throughout the several views, FIG. 1 is a view showing a hardware configuration of a computer apparatus 10 such as a notebook personal computer (notebook PC) as an example of an electrical instrument. In the computer apparatus 10 shown in FIG. 1, a CPU 11 functions as a brain of the entire computer apparatus 10, and executes a variety of programs under control of an OS. This CPU 11 is interconnected to respective constituent elements through three buses, which are: a front side bus (FSB) 12 as a system bus; a peripheral component interconnect (PCI) bus 20 as a bus for high-speed I/O devices; and a low pin count (LPC) bus 40 as a new interface replacing an ISA bus. This CPU 11 achieves an enhancement of processing speed by storing program codes and data in a cache memory. In order to make up for a shortage of a capacity of a primary cache provided inside the CPU 11, in some cases, a secondary cache 14 is placed through a back side bus (BSB) 13 serving as an exclusive bus.

The FSB 12 and the PCI bus 20 are connected to each other by a CPU bridge (host-PCI bridge) 15 called a memory/PCI chip. This CPU bridge 15 has a configuration including a memory controller function for controlling an access operation to a main memory 16, a data buffer for absorbing a difference in data transfer rate between the FSB 12 and the PCI bus 20, and the like. The main memory 16 is a writable memory utilized as a reading area of execution programs of the CPU 11 and as a work area into which processed data is written. In these execution programs, the OS, various types of drivers, various types of application programs, and firmware such as an basic input/output system (BIOS) are included. A video subsystem 17 is a subsystem for realizing functions relating to a video, and includes a video controller. This video controller processes a drawing command from the CPU 11 to write drawing information into a video memory, and reads out this drawing information from the video memory to output the drawing information as drawing data to a liquid crystal display (LCD) 18.

To the PCI bus 20, individually connected are an I/O bridge 21, a card bus controller 22, an audio subsystem 25, a docking station interface (Dock I/F) 26, and a miniPCI connector (slot) 27. The card bus controller 22 is an exclusive controller for directly connecting a bus signal of the PCI bus 20 to an interface connector (card bus) of a card bus slot 23. It is possible to load a PC card 24 into this card bus slot 23. The docking station interface 26 is hardware for connecting a docking station (not shown) serving as a function expansion device of the computer apparatus 10 to the PCI bus 20. When a notebook PC is set on the docking station, various types of hardware elements connected to an internal bus of the docking station are connected to the PCI bus 20 through the docking station interface 26. Moreover, a miniPCI card 28 in which, for example, a wireless LAN module is incorporated is connected to the miniPCI connector 27.

The I/O bridge 21 includes a bridge function between the PCI bus 20 and the LPC bus 40. Moreover, the I/O bridge 21 includes an integrated device electronics (IDE) interface function. An interface realized by this function is used for an AT attachment packet interface (ATAPI) connection of a CD-ROM drive 32 as well as a connection of an IDE hard disk drive (HDD) 31. Instead of this CD-ROM drive 32, other types of IDE devices such as a digital versatile disc (DVD) drive may be connected to the I/O bridge 21. Moreover, a USB port is provided in this I/O bridge 21 and connected to a USB connector 30. Furthermore, to the I/O bridge 21, an EEPROM 33 is connected through an SM bus. Moreover, a plurality of connectors 47 are connected to the I/O bridge 21 through an audio CODEC '97 (AC 97) for supporting a modem function, a LAN connect interface (LCI) serving as an interface for Ethernet® incorporated in a core chip, a USB and the like. Each of the plurality of connectors 47 is configured such that a communication card 48 is connectable thereto.

Moreover, the I/O bridge 21 is connected to a power supply circuit 50. The power supply circuit 50 is configured such that an AC adapter 51, a main battery (first battery) 52 and a second battery (sub-battery) 53, which are secondary batteries, are connectable thereto. Furthermore, the power supply circuit 50 includes a battery switching circuit 54 which switches either the main battery 52 or the second battery 53 to be active based on an instruction from an embedded controller 41 to be described later, a DC/DC converter (DC/DC) 55 which generates constant direct voltages of 5V, 3.3V and the like for use in the computer apparatus 10, a charging circuit 56 for charging the main battery 52 and the second battery 53, and the like.

To the LPC bus 40, connected are the embedded controller 41, a flash ROM 44, and a super I/O controller 45. Furthermore, the LPC bus 40 is used for connecting peripheral instruments operating at relatively low speed, such as a keyboard/mouse controller, to the computer apparatus 10. Moreover, a gate array logic 42 is connected to the embedded controller 41. To the super I/O controller 45, an I/O port 46 is connected. The embedded controller 41 controls an unillustrated keyboard, and is connected to the power supply circuit 50 to be in partial charge of a power supply management function.

Figure 2:
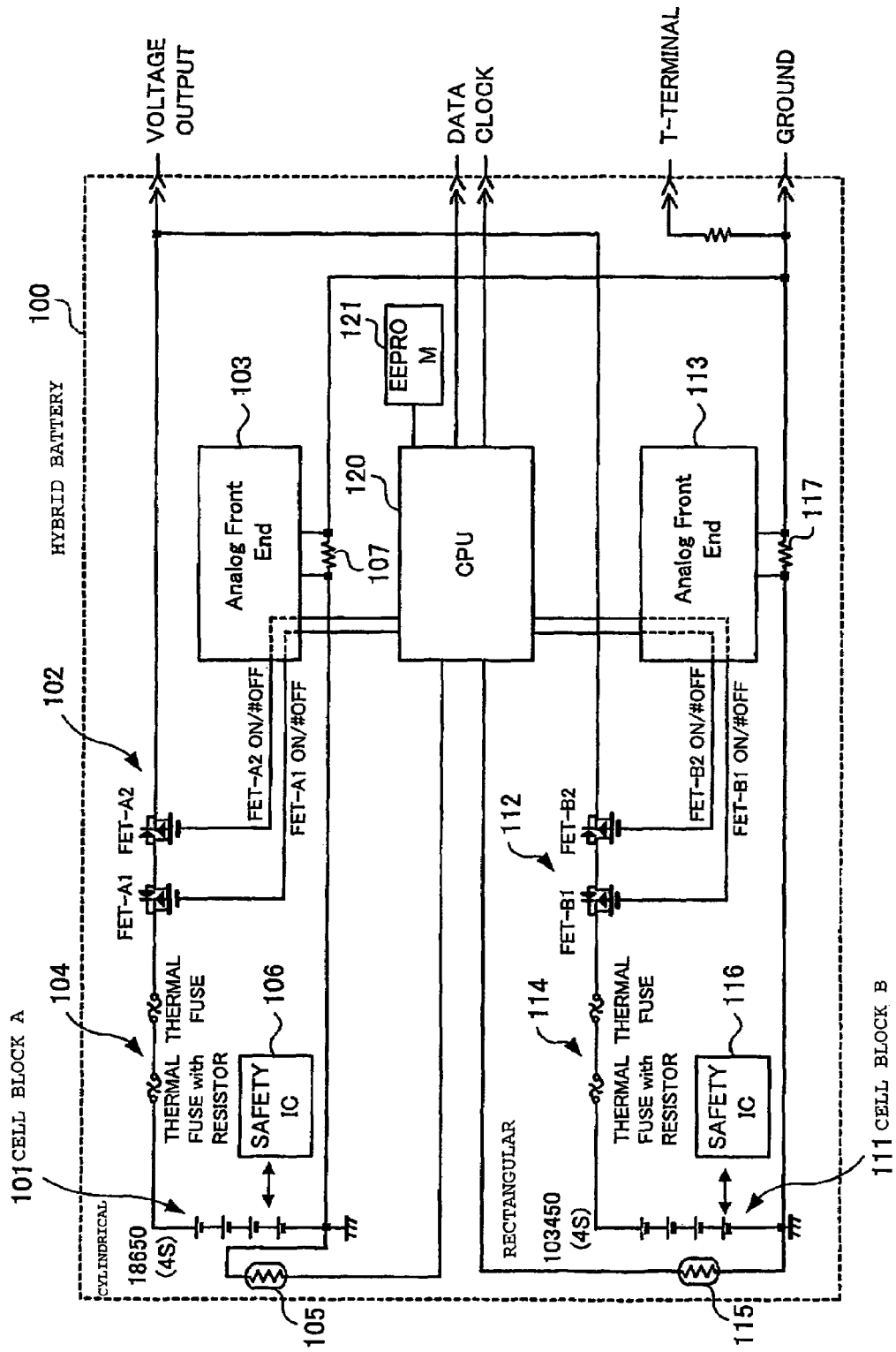
FIG. 2 is a view showing an entire configuration of a hybrid battery to which this embodiment is applied.

FIG. 2 is a view showing the entire configuration of a hybrid battery 100 to which this embodiment is applied. The hybrid battery 100 constituting the battery pack is a battery, which is used in the main battery 52 or the second battery 53, and in which a plurality of battery blocks (cell blocks) are arranged. In the hybrid battery 100 shown in FIG. 2, two cell blocks are provided, which are: a cell block A (first battery) 101; and a cell block B (second battery) 111. The cell block A 101 is composed of, for example, four cylindrical lithium-ion cells connected in series, and the cell block B 111 is composed of, for example, four rectangular lithium-ion cells connected in series. Each group of battery cells of the same type constitutes each cell block. Each cell block is composed by connecting single cell batteries in series or in parallel. These cell blocks (cell blocks A 101 and B 111) are not electrically connected to each other. In such a way, the different battery cells are not electrically connected to each other, and accordingly, a deterioration of the cells does not occur. Moreover, even if the cells are mixed, it becomes possible to handle the cells as one battery pack. Furthermore, in general, the cell block A 101 and the cell block B 111 are configured so as to be selectively active. The respective cell blocks (cell blocks A 101 and B 111) of the hybrid battery 100 are configured so as to be connectable to a charging circuit (not shown), and are charged by receiving a supply of electrical power from the AC adapter 51. Moreover, it is possible that the respective cell blocks (cell blocks A 101 and B 111) is connected to the DC/DC converter (DC/DC) 55 to supply electrical power to a system body of the computer apparatus 10 by discharging.

Moreover, the hybrid battery 100 includes a CPU 120 which executes a management of residual capacities of the respective cell blocks and a switching control between the cell block A 101 and the cell block B 111, and an EEPROM 121 serving as a memory for work of the CPU 120. The CPU 120 entirely controls the hybrid battery 100 serving as the battery pack, and administers communication with the embedded controller 41 of the system body to achieve predetermined communication with the embedded controller 41 through, for example, a smart battery system (SBS) interface in conformity with the SBS. Moreover, the CPU 120 executes a switching control between the respective cell blocks in this embodiment. The CPU 120 serving as a controller inside the hybrid battery 100 manages data of a total capacity of the respective cell blocks (total battery capacity), handles the respective cell blocks as one battery pack, and sends the capacity data to the system body (embedded controller 41). In these ways, it becomes possible to handle the battery pack in which the different battery cells are mixed as one battery pack (it does not always matter whether or not the cabinet is the same one).

Furthermore, the hybrid battery 100 includes similar functional configurations for each of the cell blocks (cell blocks A 101 and B 111). For example, a protecting field effect transistor (FET) is connected to each of the cell blocks. An FET 102 of the cell block A 101 includes FET-A1/FET-A2 which perform stop of discharge/stop of charge, and in a similar way, an FET 112 of the cell block B 111 includes FET-B1/FET-B2 which perform the stop of discharge/stop of charge. In this embodiment, the switching between the cell block A 101 and the cell block B 111 is enabled by use of the FET 102 and the FET 112, which are usually used for the protection. In such a way, the switching between the cell blocks is performed by use of the conventional protection circuit, and accordingly, the hybridization of the battery is realized at the minimum cost.

Moreover, the hybrid battery 100 includes analog front ends 103 and 113 serving as ASICS for analog circuits which perform measurements of voltages of the respective cell blocks and measurements of current values thereof. In this embodiment, when the CPU 120 controls ON/OFF of the FETs 102 and 112, the CPU 120 outputs commands to the analog front ends 103 and 113. In the analog front ends 103 and 113 having received the commands, circuits thereof partially function to specifically turn ON/OFF the FETs 102 and 112. For example, when the cell block A 101 is made active to discharge, the CPU 120 outputs a command to turn ON the FET-A1 and the FET-A2 of the FET 102 to the analog front end 103, and outputs a command to turn OFF the FET-B1 and the FET-B2 of the FET 112 to the analog front end 113. Based on such outputs, the analog front ends 103 and 113 turn ON/OFF the FETs 102 and 112. On the contrary, when the cell block B 111 is made active to discharge, setting and control are performed such that the FET-A1 and the FET-A2 are turned OFF and the FET-B1 and the FET-B2 are turned ON.

These analog front ends 103 and 113 output values of voltages and currents, which are generated between both ends of resistors 107 and 117, respectively. The CPU 120 outputs the commands to the analog front ends 103 and 113, and after an elapse of a certain time, observes values of voltages and currents in analog ports (or the resistors) of the analog front ends 103 and 113. The CPU 120 converts the observed values of voltage and current into the number of cycles, thus making it possible to grasp the numbers of charge/discharge cycles of the cell block A 101 and the cell block B 111.

Moreover, in the hybrid battery 100, fuses 104 and 114 serving as protection functions and thermistors 105 and 115 which detect temperature rises are provided so as to correspond to the respective cell blocks. Furthermore, safety ICs 106 and 116, which measure the voltages of the respective cell blocks and blow the fuses 104 and 114 when the voltages rise more than a preset value, are provided individually in the respective cell blocks. Thus, far more safety is ensured even if a malfunction occurs in the CPU 120 and it becomes impossible to control the FETs 102 and 112.

Here, a relationship between the number of charge/discharge cycles and the capacity in each of the cell blocks (cell blocks A 101 and B 111) will be considered.

Figure 3:
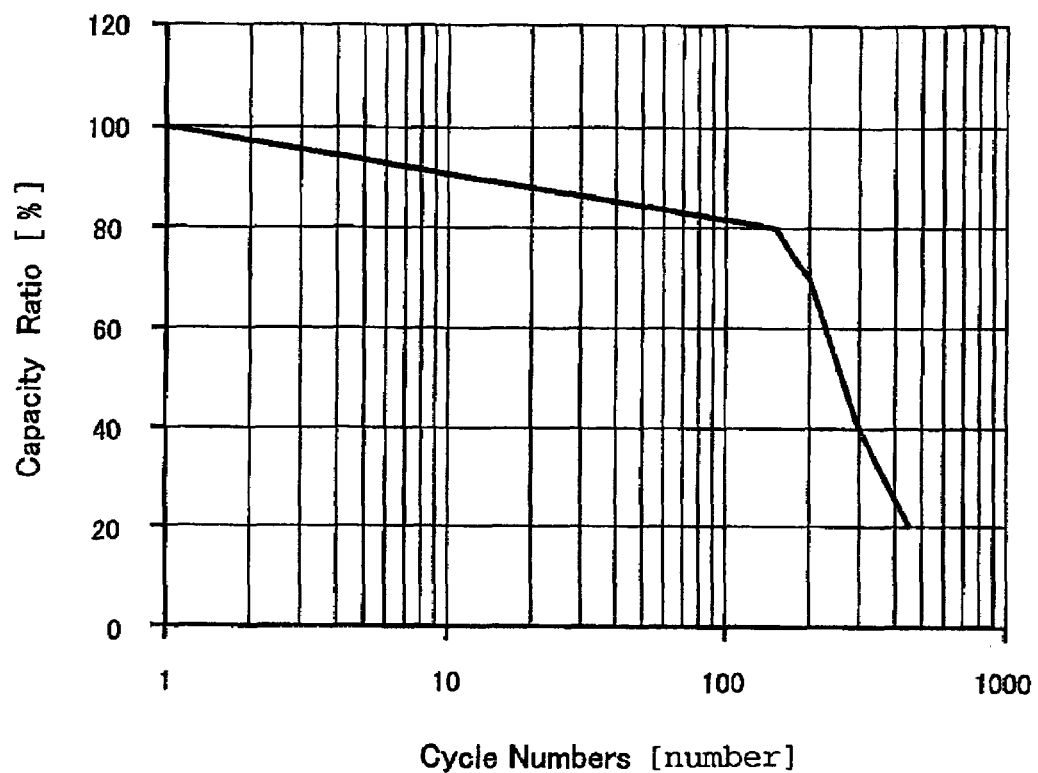
FIG. 3 is a graph showing a relationship between the number of charge/discharge cycles of a cell block and a capacity thereof in a lithium-ion battery.

FIG. 3 is a graph showing a relationship between the number of charge/discharge cycles and a capacity in a cell block of a lithium-ion battery. An axis of abscissas represents the number of charge/discharge cycles, which is represented by logarithms, and an axis of ordinates represents a ratio (%) of the capacity of the battery. From this graph, it can be read that the more the number of charge/discharge cycles is increased, the more a degree of deterioration of the cell block is increased. More specifically, it can be understood that the ratio of the capacity is radically decreased from about a point where the number of charge/discharge cycles exceeds 100 cycles. This is one of the characteristics of the cell block, and both of the cell block A 101 as the cylindrical lithium-ion cells and the cell block B 111 as the rectangular lithium-ion cells exhibit a substantially similar characteristic.

FIGS. 4(a) and 4(b) are views for considering a specific degree of deterioration in the hybrid battery 100 using the cell blocks having such a deterioration characteristic. In FIGS. 4(a) and 4(b), it is assumed that the same cell blocks are used and the cell block A 101 and the cell block B 111 have the same capacity. In this case, if it is assumed as shown in FIG. 4(a) that the number of charge/discharge cycles of one of the cell blocks is 300 cycles (40% capacity) and the number of charge/discharge cycles of the other cell block is 0 cycle (100% capacity), then it can be conceived that, as the battery pack, the number of charge/discharge cycles is 150 cycles, and a capacity thereof (total battery capacity) becomes 70%. On the other hand, in the case as shown in FIG. 4(b) where the numbers of charge/discharge cycles of both of the cell blocks are 150 cycles (82% capacity), then, as the battery pack, the number of charge/discharge cycles is 150 cycles, and a capacity thereof (total battery capacity) becomes 82%. Hence, the more even the numbers of cycles of both of the cell blocks are, the more the degree of deterioration of the entire battery pack is reduced. Moreover, it can be understood that the degree of deterioration of the entire battery pack is reduced in a similar way if the numbers of cycles of three or more cell blocks are even also in the case where the three or more cell blocks are provided.

Therefore, in this embodiment, a configuration is adopted, in which a difference between the numbers of charge/discharge cycles in the respective cell blocks (cell blocks A 101 and B 111) falls to a certain threshold value or less, and a control to switch to a cell block which is active in a discharge is performed by the CPU 120.

Figure 5:
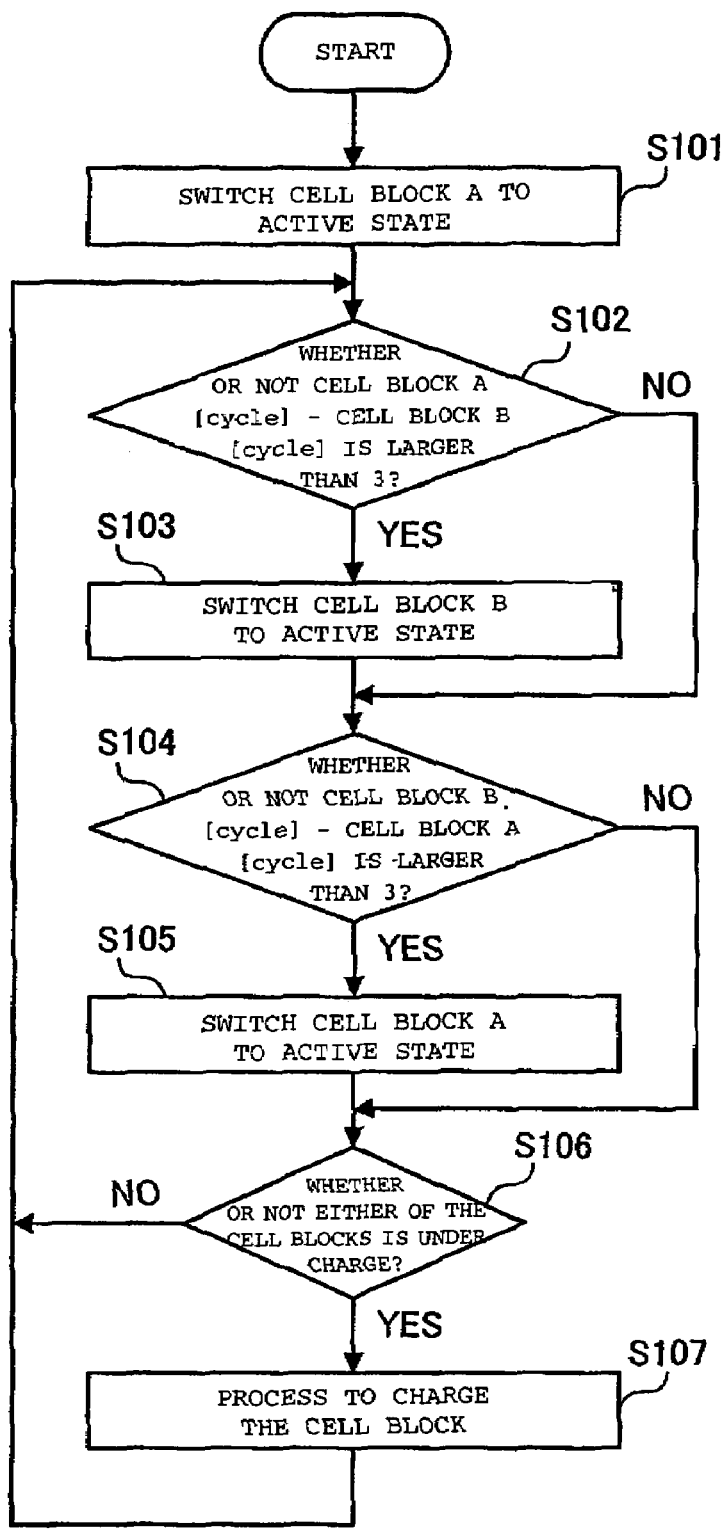
FIG. 5 is a flowchart showing switching control processing for the cell blocks, which is executed by a CPU.

FIG. 5 is a flowchart showing switching control processing for the cell blocks, which is performed by the CPU 120. Here, the numbers of cycles are controlled basically in a discharge. In an initial setting, first, the cell block A 101 is set to be switched to an active state (Step 101). Next, the number of cycles of the cell block A 101 and the cell block B 111 are individually recognized, and are compared with each other. Then, it is determined whether or not a value (delta) obtained by subtracting the number of cycles of the cell block B 111 from the number of cycles of the cell block A 101 is larger than "3" preset as a predetermined value (Step 102). When the delta is larger than 3, the cell block B 111 is switched to an active state (Step 103), and the cell block B 111 is controlled to discharge toward the system body. When the delta is not larger than 3, the processing directly proceeds to the next step.

Next, the numbers of cycles of the cell block B 111 and the cell Block A 101 are compared with each other, and it is determined whether or not a value (delta) obtained by subtracting the number of cycles of the cell block A 101 from the number of cycles of the cell block B 111 is larger than "3" preset as the predetermined value (Step 104). When the delta is larger than 3, the cell block A 101 is switched to the active state (Step 105), and the cell block A 101 is controlled to discharge toward the system body. When the delta is not larger than 3, the processing directly proceeds to the next step. Then, it is determined whether or not either of the cell blocks is under charge (Step 106). When both of the cell blocks are not under charge, the processing returns to Step 102, from which the above-described processing is executed. When either of the cell blocks is under charge, charging processing is executed therefor (Step 107), and the processing returns to Step 102.

In such a way, in the charge, the active cell blocks are alternately switched depending on charged states thereof. In this case, the cell block which is active in the discharge is controlled based on the numbers of cycles as described above, thus making it possible to set the numbers of cycles of the cell block A 101 and the cell block B 111 substantially equivalent to each other. Specifically, according to this embodiment, the numbers of charge/discharge cycles of the respective cell blocks are controlled, thus making it possible to control, to the minimum, the deterioration of the respective cell blocks of the hybrid battery, which is caused by the imbalance between the numbers of charge/discharge cycles of the respective cell blocks. Note that the number "3" used for control is one determined as an approximate range (upper limit) until which the numbers of charge/discharge cycles can be regarded as equivalent (even) to each other, and substantially, it is also possible to regard the numbers of cycles as equivalent to each other until approximately the number "10." As a result of the processing as described above, in this embodiment, a configuration can be adopted, in which the cell block in which the number of charge/discharge cycles is smaller is preferentially selected to be active.

Furthermore, it is also possible to apply this embodiment also to a so-called dual battery system composed of a main battery and a second battery.

Figure 6:
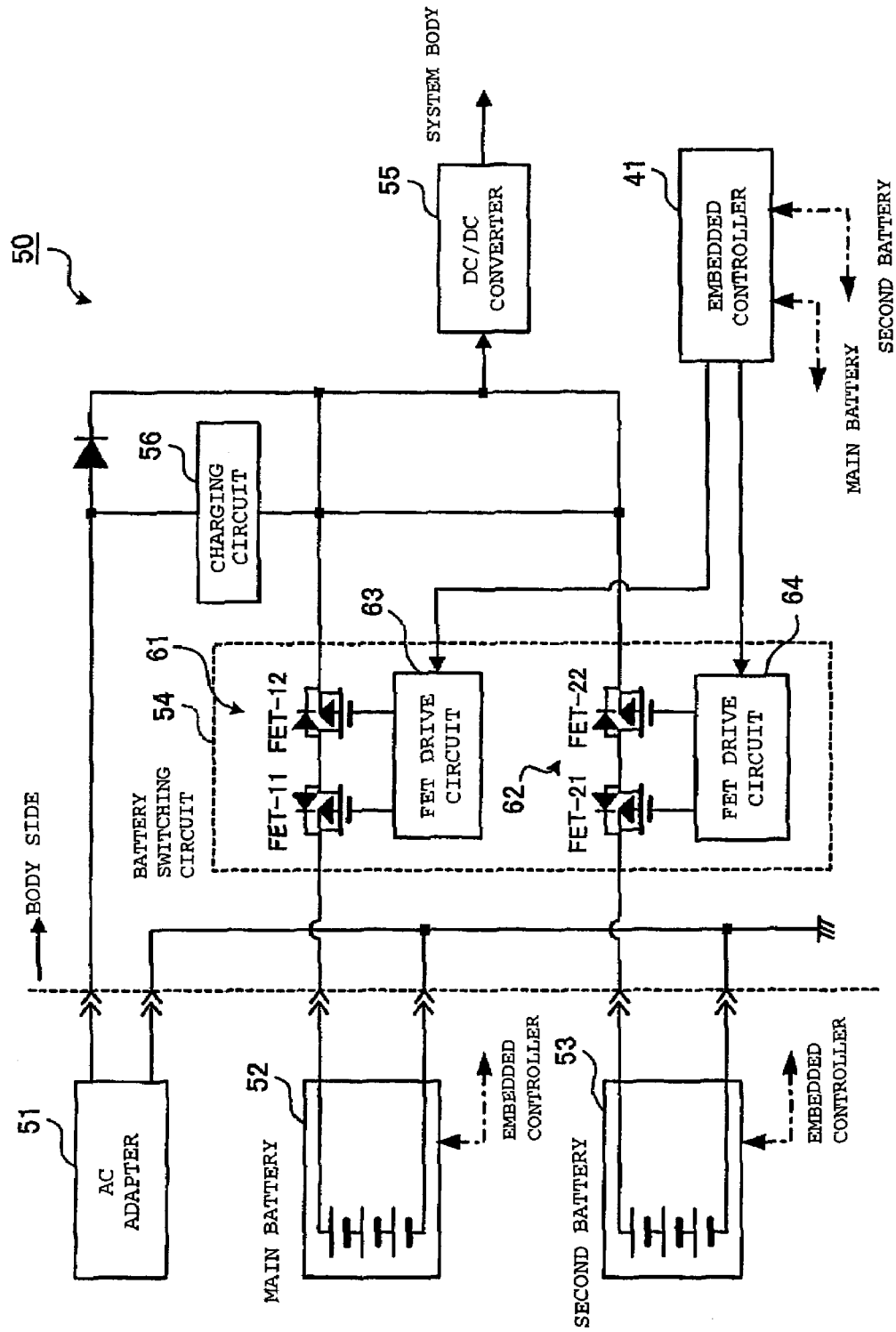
FIG. 6 is a view for explaining a configuration of a power supply circuit to which a dual battery system in this embodiment is applied.

FIG. 6 is a view for explaining a configuration of the power supply circuit 50 to which the dual battery system in this embodiment is applied. In the system shown in FIG. 6, the battery switching circuit 54 in which the switching control is performed by the embedded controller 41 is provided, and the switching between the main battery 52 and the second battery 53 is performed based on the numbers of charge/discharge cycles of the main battery 52 and the second battery 53. In this battery switching circuit 54, provided are an FET 61 (FET-11 and FET-12) which turns the charge of the main battery 52 ON/OFF and turns the discharge thereof ON/OFF, and an FET 62 (FET-21 and FET-22) which turns the charge of the second battery 53ON/OFF and turns the discharge thereof ON/OFF. Moreover, there are provided an FET drive circuit 63 which drives the FET 61, and an FET drive circuit 64 which drives the FET 62. The FET drive circuits 63 and 64 turn ON/OFF the respective EFTs by receiving commands from the embedded controller 41. The main battery 52 and the second battery 53 transfer, with the embedded controller 41, information regarding the numbers of charge/discharge cycles as well as information regarding the battery capacities and the like through, for example, the interface of the SBS.

Specifically, when the main battery 52 and the second battery 53 in the dual battery system are intelligent batteries including internal CPUs respectively, it is possible for the embedded controller 41 to recognize the numbers of charge/discharge cycles thereof based on information from these internal CPUs. More specifically, the values of the currents and the voltages, which are outputted from the analog front ends provided in the respective batteries, are acquired by the internal CPUs of the respective batteries, and the numbers of charge/discharge cycles are obtained from the acquired values of the currents and the voltages. The embedded controller 41 can recognize such numbers of charge/discharge cycles through the interface of the SBS.

In the dual battery system shown in FIG. 6, by replacing the respective elements shown in FIG. 2 with the respective elements shown in FIG. 6, the functions and the switching control processing, which have been described with reference to FIGS. 2 to 5, can be applied to the respective elements shown in FIG. 6. For example, the cell block A 101 is replaced with the main battery 52, the cell block B 111 is replaced with the second battery 53, the FETs 102 and 112 are replaced with the FETs 61 and 62, the analog front ends 103 and 113 are replaced with the FET drive circuits 63 and 64, and the control which has been performed by the CPU 120 is allowed to be performed by the embedded controller 41. Thus, a similar effect to that shown in FIGS. 3 and 4 can be obtained.

Figure 7:
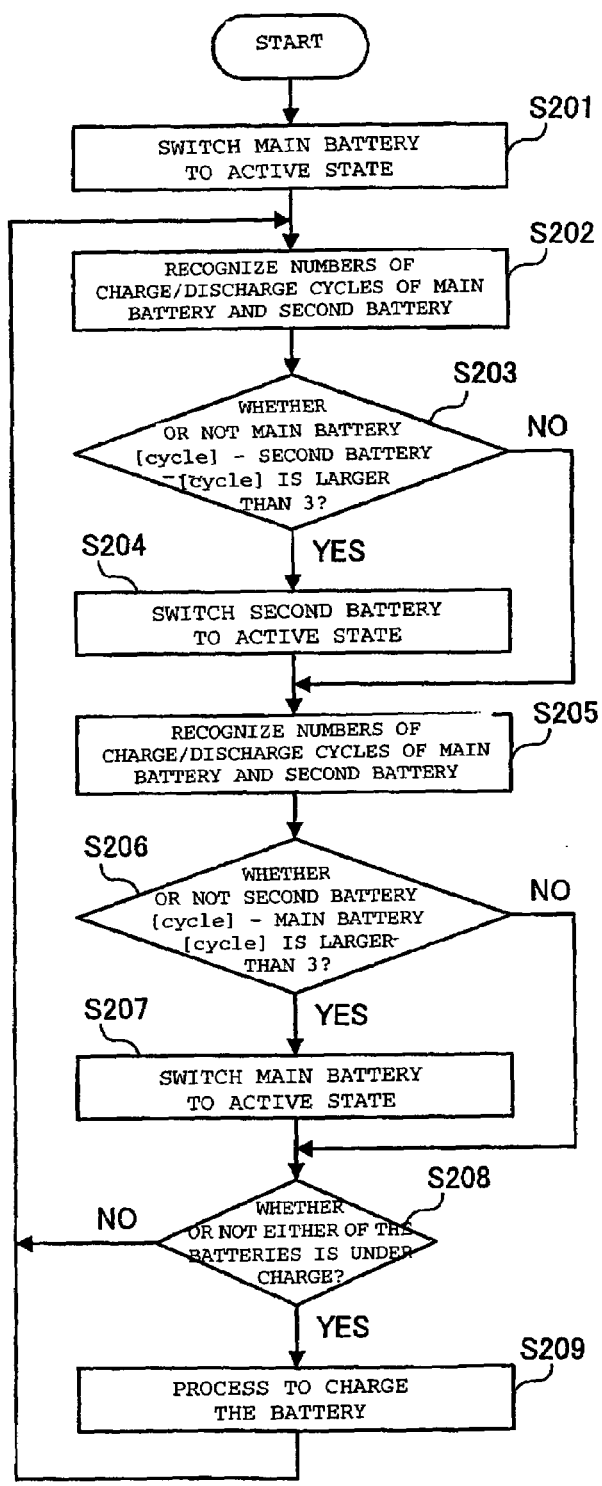
FIG. 7 is a flowchart showing switching processing between batteries in the dual battery system.

FIG. 7 is a flowchart showing switching processing between the batteries in the dual battery system. Here, processing for selecting the battery to serve as a supply source of the electrical power by the control of the embedded controller 41 and the operation of the battery switching circuit 54 is shown, and the numbers of cycles are controlled basically in the discharge. In an initial setting, first, the battery switching circuit 54 switches the main battery 52 to an active state based on an instruction from the embedded controller 41 (Step 201). Next, the embedded controller 41 recognizes the numbers of charge/discharge cycles of the main battery 52 and the second battery 53 through, for example, the SBS interface (Step 202). Then, it is determined whether or not a value (delta) obtained by subtracting the number of cycles of the second battery 53 from the number of cycles of the main battery 52 is larger than "3" preset as a predetermined value (Step 203). When the delta is larger than 3, the second battery 53 is switched to an active state (Step 204), and the second battery 53 is controlled to discharge toward the system body. When the delta is not larger than 3, the processing directly proceeds to the next step.

Next, the embedded controller 41 recognizes the numbers of cycles of the second battery 53 and the main battery 52 (Step 205). Then, it is determined whether or not a value (delta) obtained by subtracting the number of cycles of the main battery 52 from the number of cycles of the second battery 53 is larger than "3" preset as the predetermined value (Step 206). When the delta is larger than 3, the battery switching circuit 54 switches the main battery 52 to an active state based on an instruction from the embedded controller 41 (Step 207), and the main battery 52 is controlled to discharge toward the system body. When the delta is not larger than 3, the processing directly proceeds to the next step. Then, it is determined whether or not either of the batteries is under charge (Step 208). When both of the batteries are not under charge, the processing returns to Step 202, from which the above-described processing is repeated. When either of the batteries is under charge, charging processing is executed therefor (Step 209), and the processing returns to Step 202. As described above, in this embodiment, the battery in which the number of charge/discharge cycles is smaller is preferentially selected to be active from the main battery 52 and the second battery 53, and the battery to serve as the supply source of the electrical power is determined.

As described above, in the dual battery system in which both of the main battery 52 and the second battery 53 (sub-battery connected to the bay drive) are connected to the system body, the switching control is implemented such that the numbers of charge/discharge cycles of these batteries can be made even. Accordingly, a phenomenon that only one of the batteries is deteriorated can be prevented. For example, when two batteries are mounted, there exists without fail a system in which the second battery 53 discharges. In the case of utilizing such a system, in a general state of use by a user, it is rare that both of the batteries are completely used up every time, and in most cases, only the second battery 53 is used. Therefore, usually, the number of cycles of the second battery 53 becomes extremely large as compared with that of the main battery 52. In this case, a one-sided deterioration phenomenon occurs only in the second battery 53. Moreover, the capacity of the entire dual battery system is also reduced to a large extent. However, an application of this embodiment enables lifetimes of both of the batteries to be extended even, and also enables the capacity of the entire system to be maintained high.

Note that the above embodiment has been described by taking, as examples, the hybrid battery 100 having two cell blocks, and the dual battery system having two batteries, which are: the main battery 52 serving as the first battery; and the second battery 53 serving as the second battery (sub-battery). However, this embodiment can be applied to a battery pack having three or more cell blocks, and to a power supply system including three or more battery packs. In this case of including three or more battery packs, it is satisfactory if the configuration in the flowchart shown in FIG. 5 is replaced with the following configuration. Specifically, for example, a cell block in which the number of cycles is the maximum and a cell block in which the number of cycles is the minimum are extracted from the plurality of cell blocks, and a cell block to be made active is selected such that a shift amount between the numbers of cycles of these cell blocks falls to a predetermined value (for example, less than 3 cycles). With such a configuration, in the hybrid battery pack having the plurality of cell blocks and the system having the plurality of battery packs, it becomes possible to maintain the capacities thereof high, and to reduce the total degree of deterioration of the battery blocks and the like.

Moreover, a control method in this embodiment can be expanded as a program to be executed by a computer of an instrument configured such that the hybrid battery 100 which discharges to supply the electrical power to the system is connectable thereto. In particular, the control method is provided as a program to be executed by the embedded controller 41, and as a program for allowing the computer to execute the processing as shown in FIG. 7. Moreover, the control method can be expanded as a program to be executed by a computer of an instrument configured such that the plurality of batteries such as the main battery 52 and the second battery 53 are connectable thereto. When these programs are provided to the computer, besides the case where the programs are provided, for example, in a state of being installed in the notebook PC, a mode is conceived, where the programs allowed to be executed by the computer such as the notebook PC are provided by a recording medium storing the programs so as to be readable by the computer. As this recording medium, for example, DVD and CD-ROM media and the like apply. The programs are read by DVD and CD-ROM reading devices and the like, stored in a flash ROM and the like, and executed. Moreover, there is another providing mode where the programs are provided, for example, by a program transmission device through a network.

Note that, when the present invention is grasped as an invention of the recording medium as described above, the invention will be described as below. Specifically, the invention is "a recording medium storing a program for allowing a computer configured such that both of a first battery which supplies electrical power to a body consuming the electrical power and a second battery which becomes active selectively with the first battery to supply the electrical power to the body are connectable thereto, to function as: means for recognizing the number of charge/discharge cycles of the connected first battery and the number of charge/discharge cycles of the connected second battery; and means for selecting a battery to serve as a supply source of the electrical power from the first battery and the second battery based on the recognized number of charge/discharge cycles of the first battery and the recognized number of charge/discharge cycles of the second battery." In this case, the first battery can be grasped not only as the main battery 52 but also as the cell block A 101. Moreover, the second battery can be grasped not only as the second battery 53 but also as the cell block B 111. As the "computer," besides the embedded controller 41, the CPU 120 shown in FIG. 2 and the like apply in some cases.

With regard to examples of applying the present invention, the present invention can be applied to, besides the computer apparatus such as the notebook PC, an electrical instrument connectable to an external power supply and a battery, and the like. Moreover, a battery connected to the electrical instrument and a program to be executed by these apparatus and instrument can be mentioned as examples of the application.

In the drawings and specifications there has been set forth a preferred embodiment of the invention and, although specific terms are used, the description thus given uses terminology in a generic and descriptive sense only and not for purposes of limitation.

What is claimed is:

1. A battery pack, comprising:
   a first cell block which comprises one or more battery cells, and supplies electrical power by discharging after being charged to the body of an electrical instrument which consumes electrical power;
   a second cell block which comprises one or more battery cells, and supplies electrical power to the body of the electrical instrument by discharging after being charged, and becomes selectively active with the first cell block; and
   a controller which recognizes the number of charge/discharge cycles of the first cell block and the number of charge/discharge cycles of the second cell block, and selects between the first cell block and the second cell block based on the number of charge/discharge cycles of the first cell block and the number of charge/discharge cycles of the second cell block.

2. The battery pack according to claim 1, wherein the controller further compares the number of charge/discharge cycles of the first cell block and the number of charge/discharge cycles of the second cell block, and wherein the controller further preferentially selects the one in which the number of charge/discharge cycles is smaller to be active.

3. The battery pack according to claim 1,
   wherein the controller further selects the cell block becoming active such that a difference between the recognized number of charge/discharge cycles of the first cell block and the recognized number of charge/discharge cycles of the second cell block falls within a specific range.

4. Apparatus comprising:
   a body consuming electrical power;
   a hybrid battery which is connectable to the body, has a plurality of cell blocks electrically unconnected to one another arranged therein, and supplies electrical power to the body by discharging from a specific cell block among the plurality of cell blocks; and
   a controller which recognizes the numbers of charge/discharge cycles of the cell blocks, and selects the cell block becoming active such that a difference in the number of charge/discharge cycles among the cell blocks falls within a specific range.

5. Apparatus according to claim 4, wherein the controller further selects the cell block becoming active in a discharge such that differences in the recognized numbers of charge/discharge cycles among the respective cell blocks fall to a threshold value or less.

6. Apparatus comprising:
   a body consuming electrical power;
   a first battery which is connectable to the body, and supplies electrical power to the body; and a second battery which is connectable to the body, and becomes active selectively with the first battery to supply electrical power to the body;

wherein the body performs a switching control between the first battery and the second battery such that the numbers of charge/discharge cycles of the first battery and the second battery become even with each other on condition that the first battery and the second battery are connected to the body.

7. Apparatus according to claim 6, wherein the body comprises:

a controller which recognizes the numbers of charge/discharge cycles of the first battery and the second battery, and selects a battery becoming active in a discharge such that a difference between the recognized number of charge/discharge cycles of the first battery and the recognized number of charge/discharge cycles of the second battery falls to a threshold value or less; and a switching circuit which switches one of the first battery and the second battery based on an instruction from the controller.

8. Apparatus comprising:

a system body having a main battery which supplies electrical power to the system body, and a second battery which supplies electrical power to the system body and becomes selectively active with the main battery to then discharge, the main battery and second battery being connectable to the system body;

a controller which selects a battery to become active in a discharge such that a difference in the number of charge/discharge cycles between the main battery and the second battery falls within a specific range; and a switching circuit which switches one of the main battery and the second battery based on an instruction from the controller.

9. Apparatus according to claim 8, wherein the controller recognizes the number of charge/discharge cycles of the main battery and the second battery, determines whether the difference between the recognized number of charge/discharge cycles of the main battery and the recognized number of charge/discharge cycles of the second battery falls to a predetermined value or less, and selects the battery to become active in the discharge such that the difference falls to the predetermined value or less.

10. Apparatus comprising:

a main battery which supplies electrical power to a system body, and a second battery which supplies electrical power to the system body and becomes selectively active with the main battery to then discharge, the batteries being connectable to the system body;

first circuitry which recognizes the number of charge/discharge cycles of the main battery and the number of charge/discharge cycles of the second battery; and second circuitry which preferentially makes a battery active in which the number of charge/discharge cycles is smaller between the main battery and the second battery based on recognitions by the first circuitry.

11. The computer apparatus according to claim 10, wherein, on condition that there is a difference exceeding a predetermined value as a result of a comparison between the number of charge/discharge cycles of the main battery and the number of charge/discharge cycles of the second battery, which are recognized by the first circuitry, the second circuitry makes the battery in which the number of charge/discharge cycles is smaller active.

12. A method comprising:

recognizing the number of charge/discharge cycles for each of a plurality of cell blocks, the cell blocks being part of a battery which is connectable to a body which consumes electrical power, the plurality of cell blocks being electrically unconnected to one another arranged therein, the battery supplies electrical power to the body by discharging from any cell block among the plurality of cell blocks; and selecting a cell block to discharge based on the recognized number of charge/discharge cycles for each of the plurality of cell blocks.

13. The method of controlling a battery according to claim 12, wherein said cell block selection selects the cell block to discharge such that the number of charge/discharge cycles for each of the plurality of cell blocks becomes even with others.

14. A method comprising:

supplying electrical power to an electrical instrument to which both of a first battery and a second battery are connected, the first battery supplying electrical power to a body consuming electrical power and the second battery becoming active selectively with the first battery and supplying electrical power to the body, said supply of electrical power being achieved by:

recognizing the number of charge/discharge cycles of the first battery and the number of charge/discharge cycles of the second battery; and selecting a battery serving as a supply source of the electrical power between the first battery and the second battery based on the recognized number of charge/discharge cycles of the first battery and number of charge/discharge cycles of the second battery.

15. The method of claim 14 wherein the battery selection selects the battery serving as the supply source of the electrical power such that the number of charge/discharge cycles of the first battery and the number of charge/discharge cycles of the second battery become even with each other.

16. A product comprising:

a computer usable medium having computer readable program code stored therein for execution on a computer configured in a manner that both of a first battery which supplies electrical power to a body consuming electrical power and a second battery which becomes active selectively with the first battery and supplies electrical power to the body are connectable thereto, the computer readable program code in said product being effective to:

recognize the number of charge/discharge cycles of the connected first battery and the number of charge/discharge cycles of the connected second battery; and select a battery serving as a supply source of the electrical power between the first battery and the second battery based on the recognized number of charge/discharge cycles of the first battery and number of charge/discharge cycles of the second battery.

17. A product according to claim 16, wherein the function to select a battery compares the number of charge/discharge cycles of the first battery and the number of charge/discharge cycles of the second battery with each other, and preferentially selects a battery in which the number of charge/discharge cycles is smaller to become active.

18. The product according to claim 16, wherein the function to select a battery selects the battery serving as the supply source of the electrical power such that the number of charge/discharge cycles of the first battery and the number of charge/discharge cycles of the second battery become even with each other.

* * * * *